(12) United States Patent
Daughtrey

(10) Patent No.: US 7,966,205 B2
(45) Date of Patent: Jun. 21, 2011

(54) FARE RULES SUMMARIZER FOR TRAVEL PLANNING

(75) Inventor: Rodney Daughtrey, Cambridge, MA (US)

(73) Assignee: ITA Software, Inc., Cambridge, MA (US)

(*) Notice: Subject to any disclaimer, the term of this patent is extended or adjusted under 35 U.S.C. 154(b) by 1328 days.

(21) Appl. No.: 09/812,224

(22) Filed: Mar. 19, 2001

(65) Prior Publication Data

US 2003/0018500 A1 Jan. 23, 2003

(51) Int. Cl.
*G06Q 10/00* (2006.01)
(52) U.S. Cl. .................................................. 705/5
(58) Field of Classification Search .............. 705/5, 6
See application file for complete search history.

(56) References Cited

U.S. PATENT DOCUMENTS

| | | | |
|---|---|---|---|
| 5,191,523 A | 3/1993 | Whitesage | |
| 5,768,578 A * | 6/1998 | Kirk et al. ................... | 707/100 |
| 6,275,808 B1 * | 8/2001 | DeMarcken .................. | 705/6 |
| 6,295,521 B1 * | 9/2001 | DeMarcken et al. .......... | 705/6 |
| 6,307,572 B1 * | 10/2001 | DeMarcken et al. .......... | 715/763 |
| 6,336,097 B1 * | 1/2002 | Scipioni ....................... | 705/6 |
| 6,360,205 B1 | 3/2002 | Iyengar et al. | |
| 6,377,932 B1 * | 4/2002 | DeMarcken ................... | 705/5 |
| 6,381,578 B1 * | 4/2002 | DeMarcken ................... | 705/6 |
| 6,609,098 B1 * | 8/2003 | DeMarcken ................... | 705/6 |
| 2001/0053989 A1 | 12/2001 | Keller et al. | |
| 2002/0016724 A1 | 2/2002 | Yang et al. | |
| 2002/0052854 A1 | 5/2002 | Baggett | |
| 2002/0065688 A1 | 5/2002 | Charlton et al. | |

FOREIGN PATENT DOCUMENTS

WO WO 01/59590 * 8/2001

OTHER PUBLICATIONS

No author, Worldspan Accepts Fares Filed Via ATPCO Service; Feb. 13, 2001; Aviation Daily; vol. 343, No. 30, p. 6; Dialog copy, 1 page.*

* cited by examiner

*Primary Examiner* — Thomas Dixon
(74) *Attorney, Agent, or Firm* — Fish & Richardson P.C.

(57) ABSTRACT

A user interface for a fare summary tool is described. The user interface is for display on a monitor and includes a fare evaluation result table that displays fare rule summaries for fares in slices of an itinerary. A method for producing a rule summary is also described. The method retrieves fares and fare rules for a city pair over a specified time period and evaluates the retrieved fares against the retrieve rules to return a status corresponding to pass, fail defer. The method produces a summary of the results of evaluating the rules that indicates the status of the rules for each category of rules and displays the summary on a user output device.

24 Claims, 8 Drawing Sheets

Slice 0
- W9 PHL-->BOS (8 fares)
- US PHL-->BOS (12 fares)
- TW PHL-->BOS (18 fares)
- LF PHL-->BOS (5 fares)
- FL PHL-->BOS (9 fares)
- DL PHL-->BOS (14 fares)
- CO PHL-->BOS (17 fares)
- AA PHL-->BOS (18 fares)

Slice 1
- W9 BOS-->PHL (8 fares)
- US BOS-->PHL (12 fares)
- TW BOS-->PHL (18 fares)
- LF BOS-->PHL (5 fares)
- FL BOS-->PHL (9 fares)
- DL BOS-->PHL (14 fares)
- CO BOS-->PHL (17 fares)
- AA BOS-->PHL (18 fares)

Slice 0

| Fare | Price | Rule summaries, 93 | | | | | | | | | | Cmbs, 98 | | | | | | |
|---|---|---|---|---|---|---|---|---|---|---|---|---|---|---|---|---|---|---|
| | | D/T | Flt | Adv | Mn | Max | Xfr | Blk | Tvl | Sls | Pen | A | B | C | D | E | F | G |
| CO.BOS->PHL.OW.Y | $504 | - | - | - | - | - | - | - | - | - | - | - | B | - | - | - | - | G |
| TW.BOS->PHL.OW.Y | $504 | - | - | - | - | - | - | - | - | - | - | - | - | - | - | E | - | G |
| TW.BOS->PHL.OW.F | $735 | - | - | - | - | - | - | - | - | - | - | - | - | - | - | E | - | G |
| CO.BOS->PHL.OW.F | $762 | - | - | - | - | - | - | - | - | - | - | - | B | - | - | - | - | G |
| US.BOS->PHL.RT.KE14QN | $73 | - | - | 14\|1 | - | - | - | - | - | - | - | - | - | - | - | - | F | - |
| DL.BOS->PHL.RT.KE14NR | $75 | - | - | 14\|1 | - | - | - | - | - | - | - | - | - | C | - | - | - | - |
| US.BOS->PHL.OW.H28NX | $109 | - | - | 0\|1 | - | - | - | - | - | - | - | - | - | - | - | - | F | G |
| DL.BOS->PHL.OW.QNR | $112 | - | - | 0\|1 | - | - | - | - | - | - | - | - | - | C | - | - | - | G |
| CO.BOS->PHL.RT.QOE14SIP | $44 | -TW- | - | 14\|1 | - | - | - | - | - | - | - | - | B | - | - | - | - | - |
| DL.BOS->PHL.OW.L8A14NR | $44 | mtwrfss | - | 14\|1 | - | - | - | - | - | - | - | - | - | C | - | - | - | G |
| TW.BOS->PHL.RT.SSE14NR | $44 | -TW- | - | 14\|1 | - | - | - | - | - | - | - | - | - | - | - | E | - | - |
| US.BOS->PHL.OW.VA14TSQN | $44 | mtwrfss | - | 14\|1 | - | - | - | - | - | - | - | - | - | - | - | - | F | G |
| FL.BOS->PHL.OW.T3FL | $44 | - | - | 3\|1\|0 | - | - | - | - | - | - | - | - | - | - | - | - | - | G |
| LF.BOS->PHL.OW.QNR | $45 | ---Ss | - | - | - | - | - | - | - | - | - | - | - | - | D | - | - | G |
| LF.BOS->PHL.RT.VR21NR | $45 | - | - | 0\|0/21 | - | - | - | - | - | - | - | - | - | - | D | - | - | - |
| CO.BOS->PHL.RT.QSE21IP | $53 | mTWr-S- | - | 21\|1 | - | - | - | - | - | - | - | - | B | - | - | - | - | - |
| AA.BOS->PHL.RT.VE21SNR | $55 | mTWr-S- | - | 21\|1 | - | - | - | - | - | - | - | A | - | - | - | - | - | - |

FARE RULES SUMMARIZER FOR TRAVEL PLANNING

BACKGROUND

This invention relates to travel planning tools.

Pricing of and combining airline fares to cover a traveler's itinerary requires checking to see if the fares of interest can be legally used, based on whether the rules associated with the fares allow them to be used for that particular itinerary. Fares and their associated rules are published by airlines and resellers, typically provided through an intermediary such as The Airline Tariff Publishing Company (ATPCO). Travel agents have computer-based tools that can be used to display the rules and restrictions for a particular fare. However, such tools are limited. For example, the tools are text-based and do not effectively convey information. For example, they often use cryptic text which can take a long time to understand and read through. Often such tools require an agent to navigate through several different interfaces.

SUMMARY

According to an aspect of the present invention, a user interface for a fare summary tool, the user interface for display on a monitor, the user interface includes a fare evaluation result table that displays fare rule summaries for fares in slices of an itinerary.

According to an additional aspect of the present invention, a method for producing a concise summary of fare rules and restrictions that the fare rules place on fares of interest includes parsing a set of query to provide at least one city pair corresponding to an origin and a destination of a flight slice and retrieving fares and fare rules for each city pair over a time period set in the query. The method further includes evaluating the retrieved fares against the retrieve rules and returning a status corresponding to pass, fail defer and producing a summary of the results of evaluating the rules the summary indicating the status of the rules for each category of rules. The fare summary is displayed on a display output device.

One or more aspects of the invention may provide some or all of the following advantages.

Aspects of the invention include a fare rule summarizer tool that concisely summarizes in one place the fare rules and restrictions for fares of interest to an end user. Aspects of the invention summarize these fare rules and restrictions in a manner that is easily understandable by glancing at a display that depicts results from the fare rule summarizer. The invention can provide a quick summary of whether evaluated fares of interest pass each type of rule. The invention can be used as a planning tool to allow a user such as a travel agent to suggest modifications for departure or arrival times to enable cheaper travel for the traveler, or to simply play what-if games with respect to cost vs. convenience for the traveler.

BRIEF DESCRIPTION OF THE DRAWINGS

The foregoing features and other aspects of the invention will be described in further detail by the accompanying drawings, in which:

FIG. 3 is a diagram depicting a graphical user interface for returned fares and rule summaries in the system of FIG. 1.

DESCRIPTION

Figure 1:
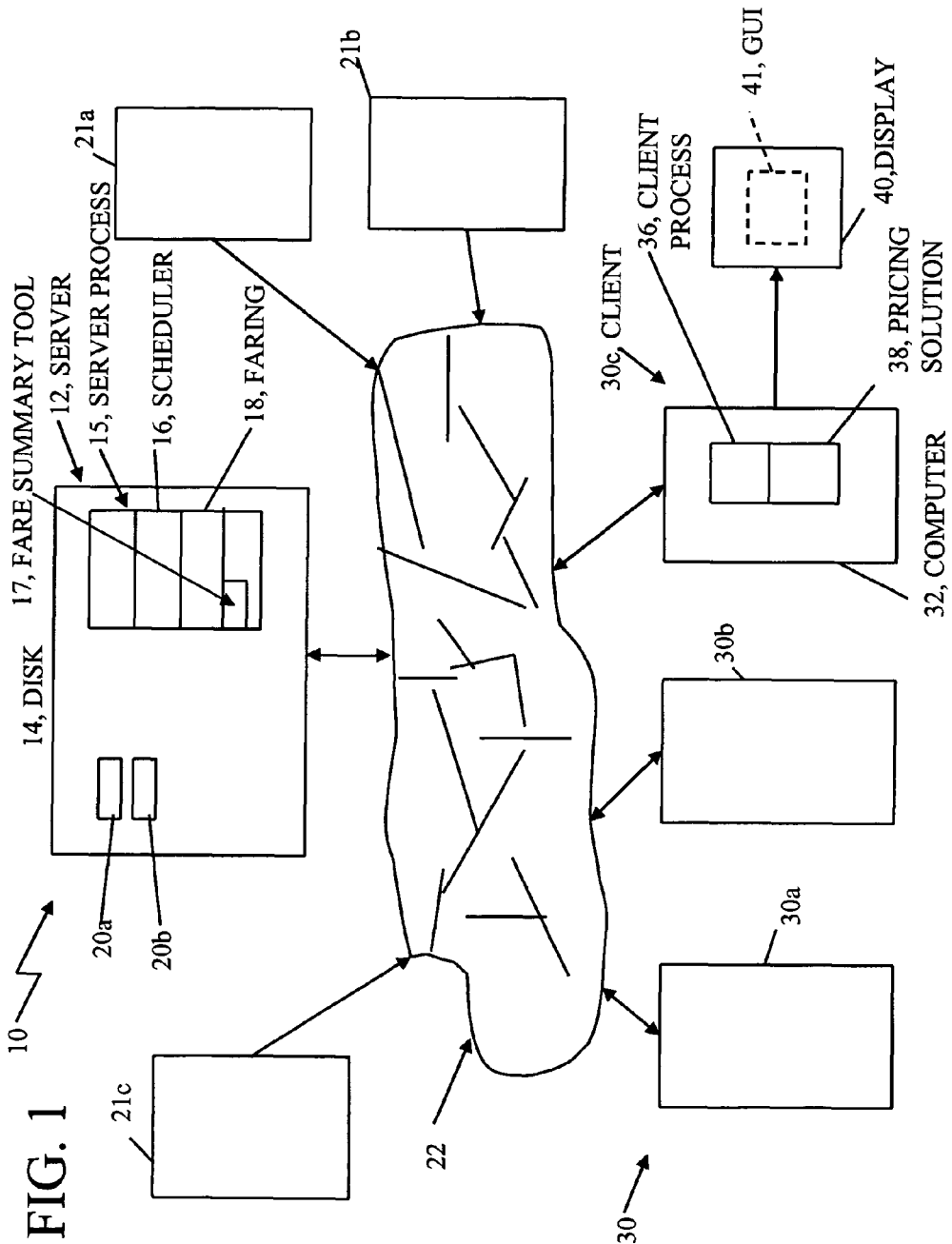
FIG. 1 is a block diagram of a client server travel planning system.

Referring now to FIG. 1, a travel planning system 10 is shown. The travel planning system 10 can be used with various forms of travel such as airline, bus and railroad and is particularly adapted for airline travel. It includes a server computer 12 having a computer memory or storage media 14 storing a server process 15 that includes a software tool 17 to produce fare rule summarizations, hereinafter referred to as the fare rule summarizer 17. The server process 15 can include a faring process 18. One exemplary faring process is that described in U.S. patent application Ser. No. 09/109,327, filed on Jul. 2, 1998, and entitled "TRAVEL PLANNING SYSTEM" by Carl deMarken et. al, and assigned to the assignee of the present invention and incorporated herein by reference. The faring process 18 is a process that determines a set of valid fares. As described in the above application, the faring process also can link the set of valid fares to sets of flights produced by a scheduling process 16, as mentioned in the above application, to form a set of pricing solutions.

The travel planning system 10 also includes a plurality of databases 20a, 20b that store industry-standard information pertaining to travel (e.g., airline, bus, railroad, etc.). For example, database 20a can store the Airline Tariff Publishing Company database of published airline fares and their associated rules, routings and other provisions, the so-called ATPCO database. Database 20b can be an inventory of current availability of airline information for a particular carrier and so forth. The databases 20a-20b are typically stored locally and updated periodically by accessing remote resources 21a, 21b that maintain the respective databases.

The system 10 also includes a plurality of clients 30a-30c implemented by terminals or, preferably, personal computers. The clients 30a-30c are coupled to the server 12 via a network 22 which is also used to couple the remote resources (21a-21c) that supply the databases 20a-20b to the server 12. The network 22 can be any local or wide area network or an arrangement such as the Internet.

The clients 30a-30c are preferably smart clients. That is, using client 30c as an illustrative example, client 30c includes a client computer system 32 including a computer memory or storage media 34 that stores a client process 36. The client process can include a web browser that interfaces to the server process 15. The client process can also include the client process described in the above-mentioned patent application. Both the client process 32 and the server process 15 can be implemented locally (not shown) on the same computer system.

A set of fares 38 is obtained from the server 12 in response to a user request sent from the client 30c to the server 12. The server 12 executes the server process 15 using the faring process 18 to produce the set of fares with an evaluation of the ATPCO maintained rules associated with the fares.

If requested by the client, for example client 30c, the server 12 can also execute a fare rule summarizer tool 17. The fare rule summarizer tool 17 has a user interface and can use portions of the faring process i.e., fare retrieval and rules evaluation to summarize the fares and results 39 of evaluating those fares against the fare rules retrieved from the ATPCO database. The requesting client 30c displays a summary of the fares and results 39 on the monitor 40. One preferred format has the summary displayed as a hypertext markup language (HTML) frame in an HTML page using a conventional web browser, for example. Other display formats could also be used.

Figure 2:
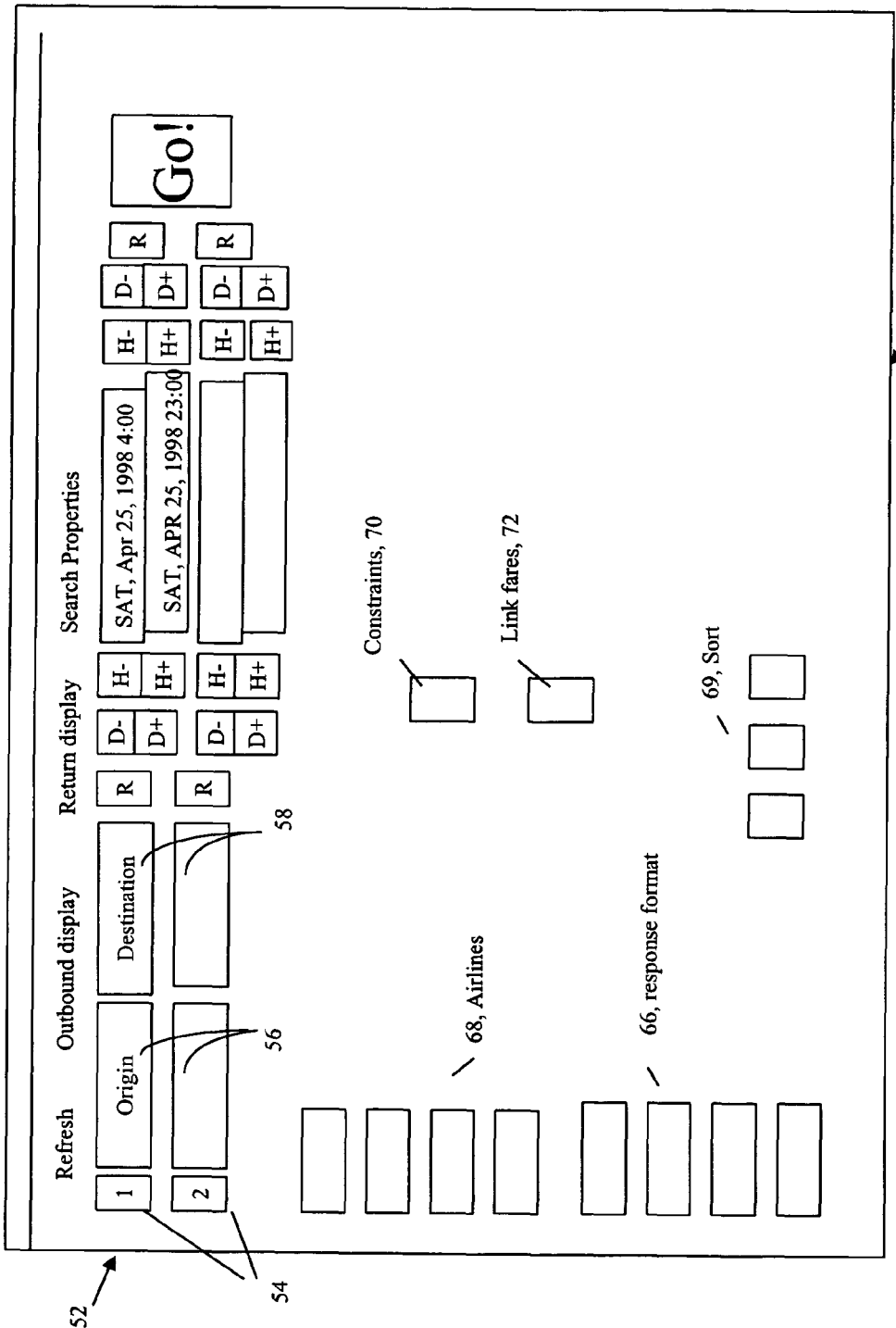
FIG. 2 is a diagram depicting a data entry screen of a graphical user interface for the system of FIG. 1.

Referring now to FIG. 2, a graphical user interface 50 for the fare/rule summarizer tool 17 is shown. The user interface 50 has a user query entry section 52 to enter information for a set of slices (i.e. trip segments) 54. The user can specify through the user interface a set of origin cities 56, a set of destination cities 58 and time windows 60 for those origins and destinations. The information is specified for each trip segment or slice 54. Trip segments 54 for trips can include one way, round trip (as shown), circle trips, open-jaw trips and so forth. The user entry section 52 can accommodate time windows as entries for arrival or departure between those dates. For example, a time window for "departure" can be from Boston to New York City departing between December 16 at 2 pm and December 17 at 2 pm. This could alternatively be set to "arrival" by a pull down control or other technique. In this case the example would specify arriving in New York City between December 16 at 2 pm and December 17 at 2 pm from Boston. Departure or arrival times can be specified for each slice of the trip. The interface 50 can have as many slices 54 that are desired by setting a user interface parameter (not shown).

In addition to specifying the origin cities, destination cities and the time windows of travel, the user can specify different parameters 64 that control, which fares are examined, which airlines are examined, and so forth. The response format 66 indicates what format answers are returned to the user. Exemplary formats include a web based e.g., hypertext markup language (HTML) format that displays the fares in a table adjacent the input area or a "parsable text" format that can be in a text format that is parsable by another computer program.

Other options allow the user to set which fares are looked up in the fare/rule summarizer 17 by selecting check box controls 68 for airlines to restrict fare look up to. The fare/rule summarizer 17 can sort 69 the fares at three different levels: 1) by status of the fare (meaning whether the fare passes, fails or defers evaluation against rules and restrictions), 2) by airline, or 3) by the fare price. For example, sorting can be by airline, within airline by fare status, i.e., whether or not a fare passes, defers or fails and then by actual fare price, and within airline and fare status by price. Other options include an option to show all of the columns for all of the rule and restriction categories regardless of whether they're empty or not, whether or not to show fares that definitely cannot be used for the itinerary, and so forth. The interface 50 can also show information about constraints between fares 70, i.e., whether or not the fares in the first slice of a trip can combine legally with other fares in other slices to form pricing solutions.

The link failed fares option 72 can control whether or not to display combined fares that have failed one or more restrictions with other failed fares in other slices. This last option shows fares as "failed" if no pricing solution exists. The fare is marked as "failed" if it cannot actually be used in a pricing solution. Complete pricing solutions are provided by the itinerary and fare search process of the above-mentioned patent application.

Referring now to FIG. 3, the user interface 50 also includes a fare rule summary frame 80 that is shown as a separate page after the query entry window of the user interface 50. Alternatively, the fare rule summary frame 80 can be rendered as a different HTML frame adjacent the query entry window or other format. The fare rule summary frame 80 includes a listing 82 of faring markets and numbers of fares within each slice.

For a round-trip query (BOS-PHL), (which has been partially modified so as to shown all features on a single page) the fare rule summary frame 80 also includes a fare rule summary table 86 (one for each slice, part of slice 0 shown) that graphically enumerates the fares and rule summaries. The fare rule summary table 86 also enumerates the price of the fare and combinality codes (Cmbs). The display is based upon how the user set up the initial query in FIG. 2.

The fare rule summary table 86 is a two-dimensional grid with the fares 88 being rows of the table. Columns of the fare rule summary table 86 include fare price 92 and rule summaries for each category 93 for which the fare has rules or restrictions. The fare rule summary table 86 also includes columns for combinality codes 98. Combinality codes 98 represent legal combinations for fares in one slice with fares in another slice. The combinality codes 98 are listed in a last set of columns of the fare rule summary table. The combinality codes 98 are assigned by the fare rule summary tool 17 and are expressed as letters of the alphabet.

Figure 4:
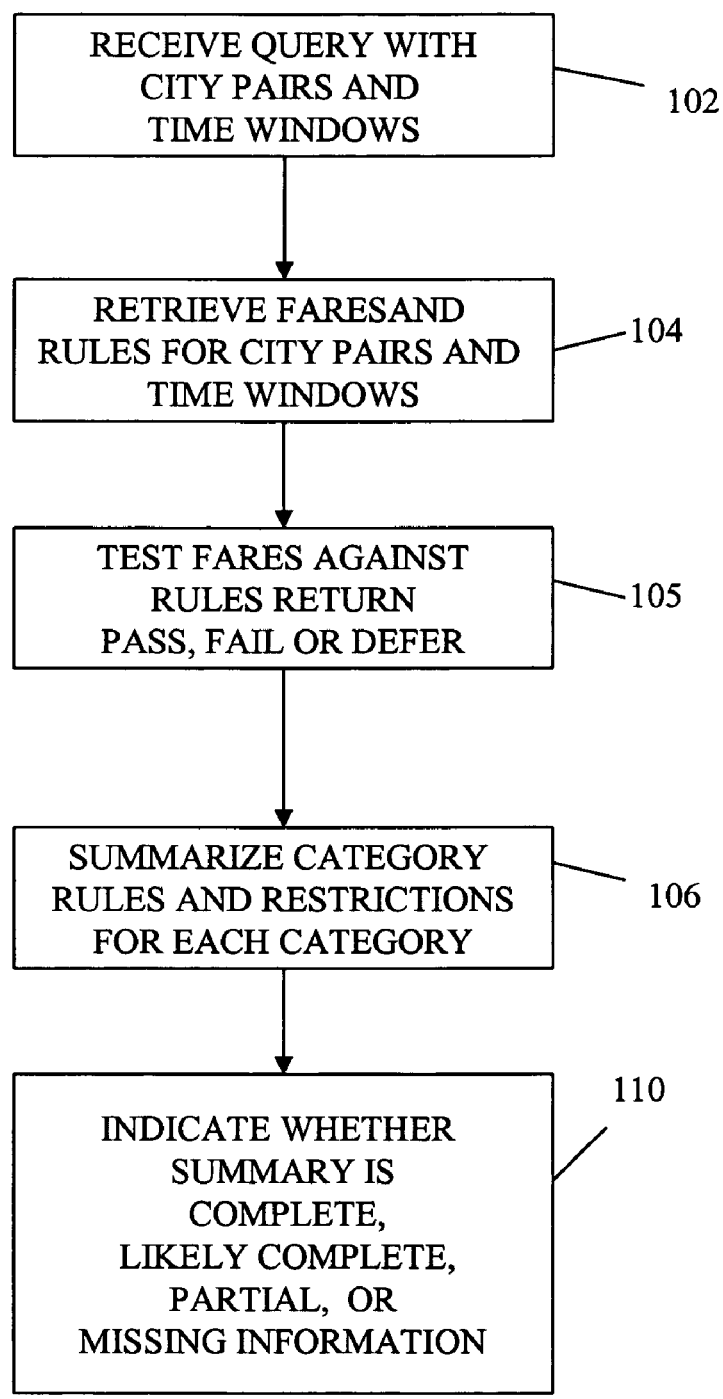
FIG. 4 is a flow chart of the fare rule summarizer tool.
Figure 5:
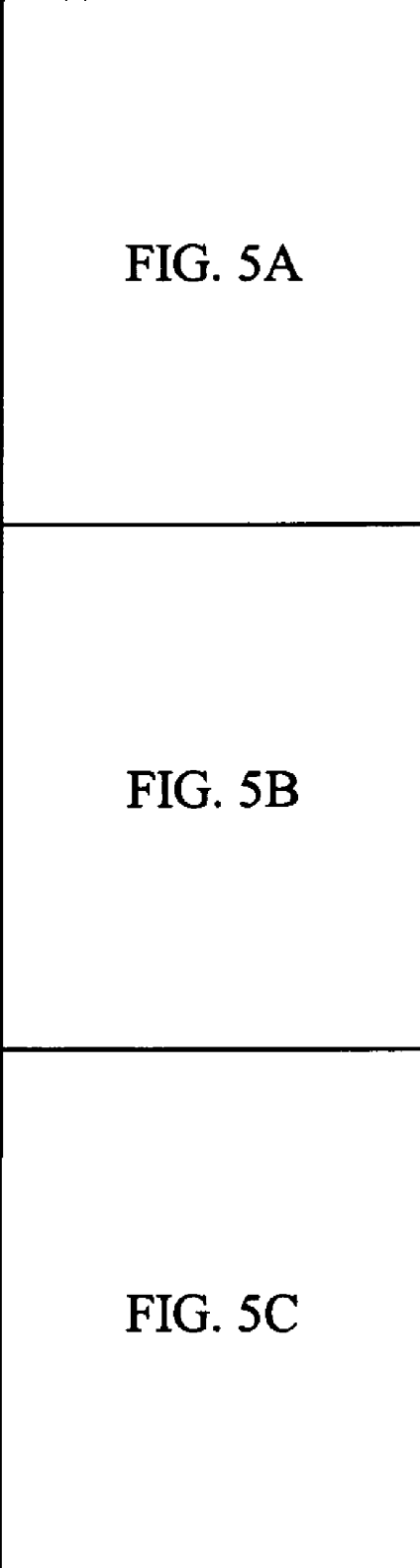
FIG. 5 shows the relationship between FIGS. 5A-5C.
Figure 5A:
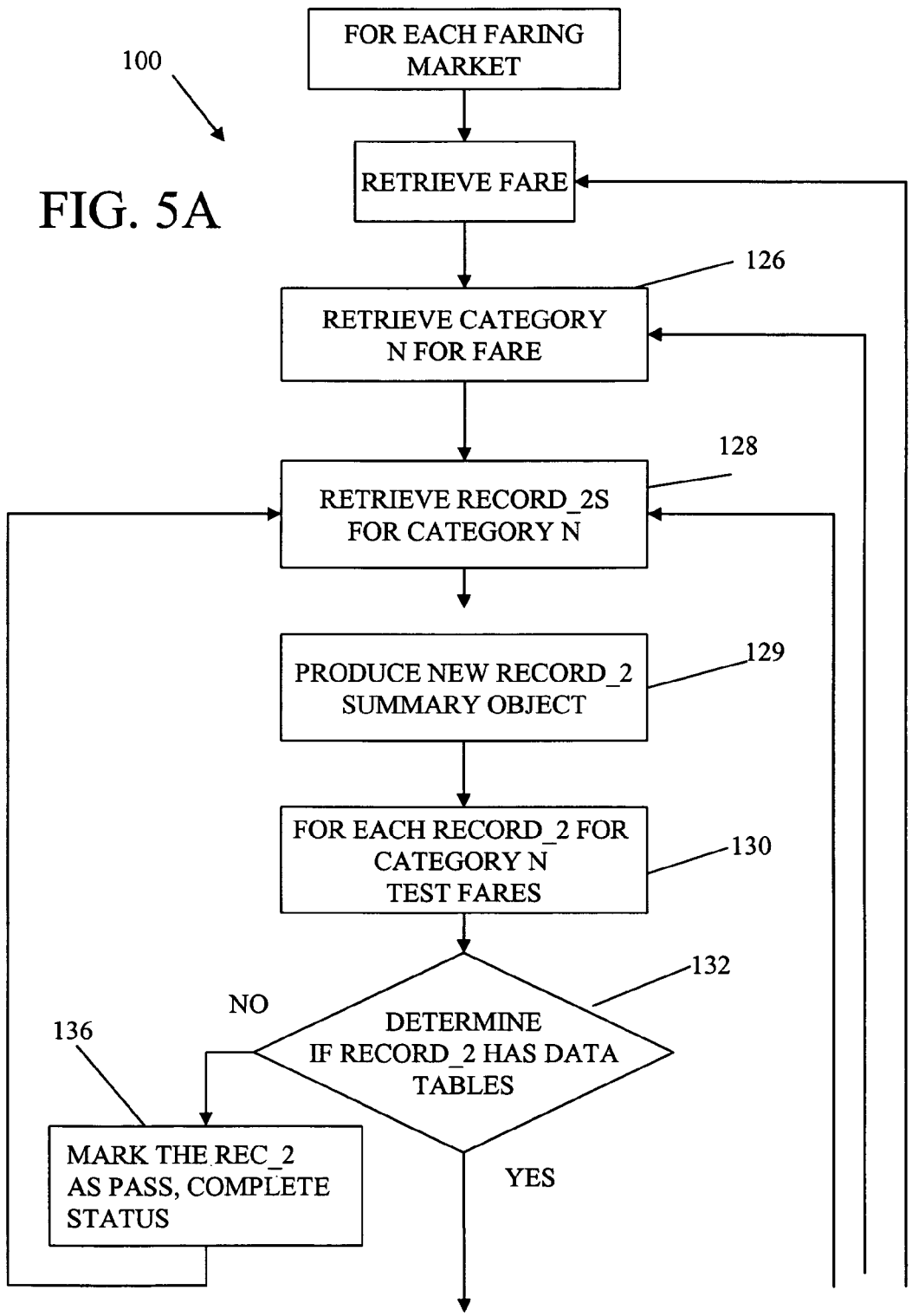
FIGS. 5A-5C are flow charts of a summarizer algorithm used in the fare rule summarizer tool of FIG. 4.
Figure 5B:
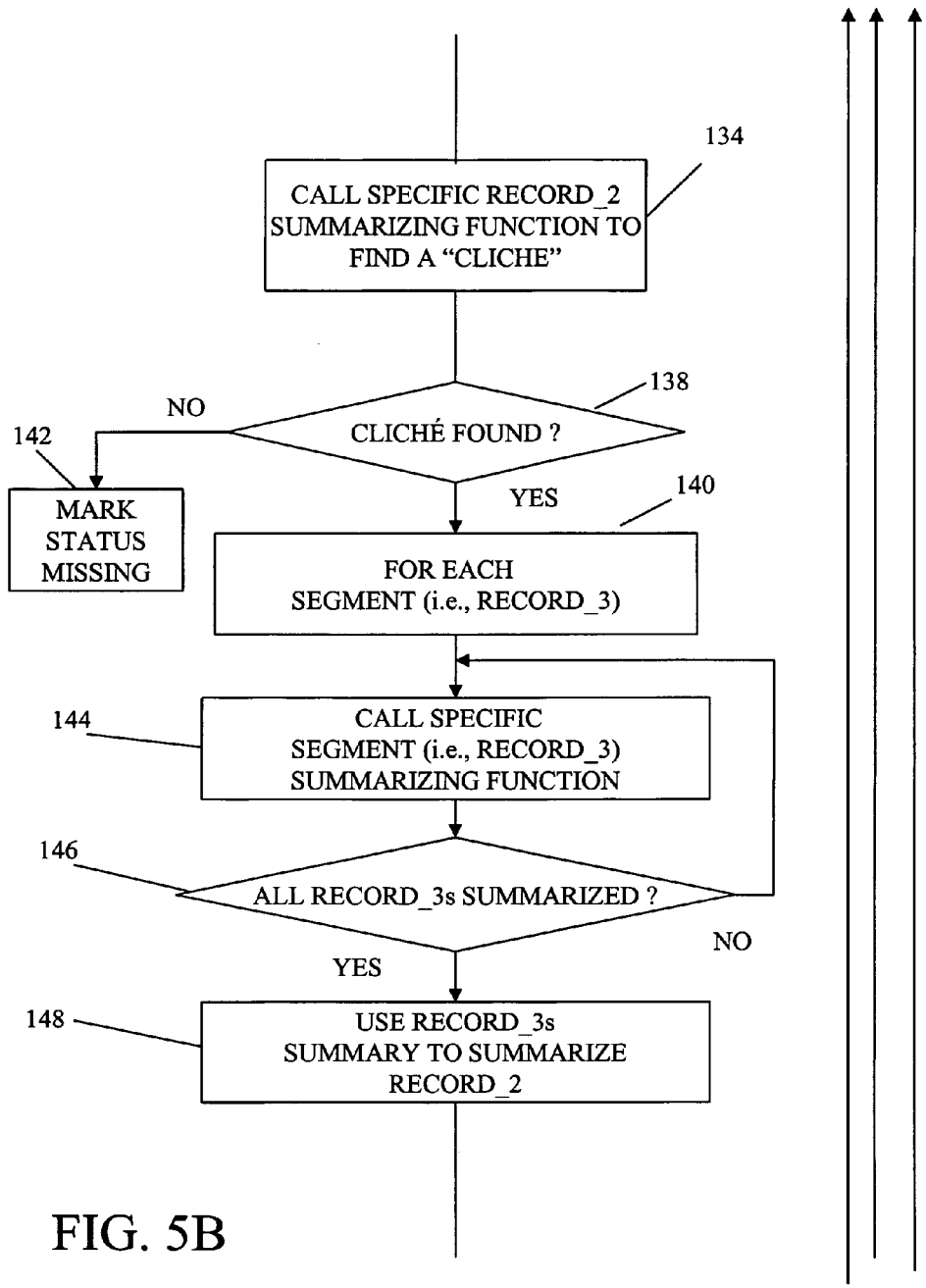
Figure 5C:
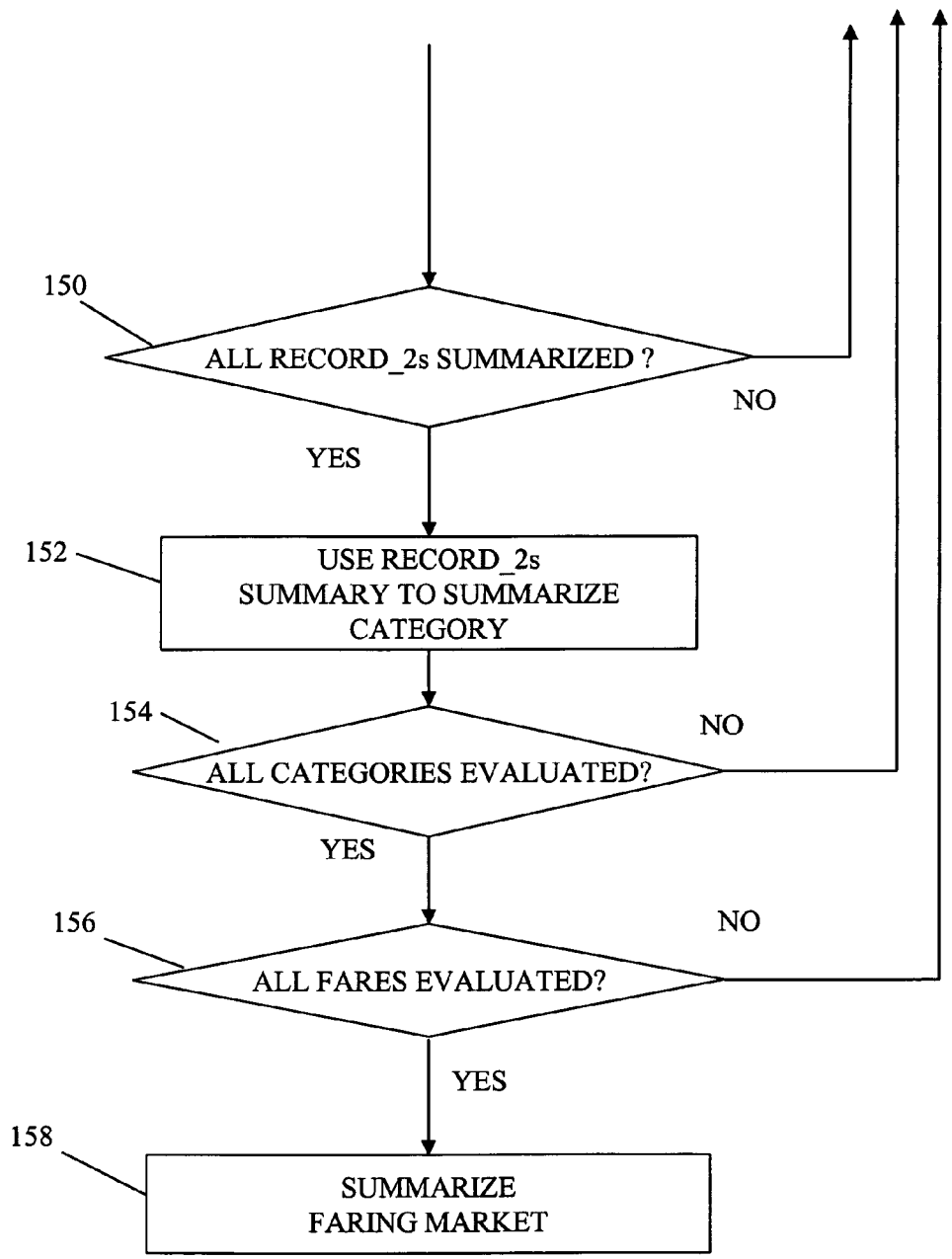

Referring now to FIG. 4, a fare summarizer process 100 to produce information for the fare rule summary table is shown. The fare summarizer process 100 receives 102 a query from the user through the query section of the user interface. The query is parsed (not shown) and information in the query is used to retrieve 104 some or all of the fares for city pairs, i.e., origins and destinations that were specified by the user, over a particular time window. The fare summarizer process 100 retrieves all of the fares for each faring market as identified by the city pairs and the departure or arrival time windows for those city pairs from the ATPCO database 20a. Fares have effective or discontinued dates and so forth, which determine whether or not the fares are applicable for the departure or arrival time windows specified in the user query. Fares that are not in the effective and discontinued date range are screened out.

The fare summarizer process 100 also determines 105 whether or not a particular fare passes or fails each rule category. The techniques used in the above mentioned application can be used for rule evaluation. The fare summarizer process 100 evaluates the fare for each rule category. The fare summarizer process applies the rule categories to each fare. The fare summarizer process 100 returns one of three values for each category for a fare. Either the fare "passes" that category meaning that the fare can be used in a pricing solution, the fare "fails" that category meaning that the fare can not be used in the pricing solution, or evaluation of that fare must be "deferred." Deferred indicates that there is not sufficient information at that point in the fare summarizer process 100 to determine whether or not the fare can be used in a pricing solution. A defer result is most likely to occur when the fare rule has a restriction that can only be evaluated at a priceable unit level or higher level.

The fare summarizer process 100 summarized 106 the results of the fare search and associated rule evaluation for each rule category. For a particular fare, there are summaries at four different levels. The first level is the summaries for all of the categories for which there are rules for that particular fare. For example, if for a particular fare from an origin to a destination there are restrictions for category 2 and restrictions for category 5, the fare summarizer process 100 would produce two category summaries, one for category 2 and one for category 5. Within a category summary, there can be a list of record 2 summaries. For a particular fare, if there are restrictions for category 2, record__2, for example, that will be expressed in a record__2 for category 2. The fare summarizer process 100 summarizes all of the record 2's associated with that category. Within a record 2, there are record 3 summaries, that is, record 2's have one or more associated record 3 summaries. The fare summarizer process 100 renders this information in one or more fare rule summary tables, as described above. The fare summarizing process 106 indicates 110 whether the summaries are complete, likely complete, partial, or missing information.

Referring again to FIG. 3 together with FIG. 4, the fare summarizer process 100 renders this information to a user, as described above for the results page 80 (FIG. 3). The information that is rendered includes the rule evaluation results 96a-96c (FIG. 3) for each of the fares, i.e., whether or not the category passes, fails or defers for each fare. Each of the rule evaluation results 96 (FIG. 3) is represented in the summary in a unique manner. One way to represent each rule evaluation results, uses a unique color. As mentioned above, the results return frame 80 is in the two-dimensional grid 86 with a plurality of rows that represent fares and a plurality of columns that represent inter alia rules, as described above. A cell 97 within this two-dimensional grid is assigned a unique background color depending on the rule evaluation results. In the example, if a fare passes a particular rule, the cell is rendered with a background color of green 96a (which in the example is most of the evaluated entries, (e.g., in the example all of the Cmbs entries are green) and denoted for only a few cells); if a rule fails, the cell uses red as a background color 96b (cells pointed to by the lines without arrowheads), and if the rule must be deferred, yellow 96c is used as the background color (cells pointed to by the lines with arrowheads). Any cell that is not evaluated for whatever reason can be rendered in gray (which is not denoted in the Figure).

In addition to the rules information, the fare summary table 86 can also depict the price of the fare 92 and a summary 94 of travel time restrictions. There are some rule evaluations that are too complex to summarize in a small amount of space. This situation is indicated by associating a missing tag with the particular category fare combination.

For each category, there is a different type of summary for a fare. For example, with day/time restrictions (ATPCO category 2), the column 94 can have up to 7 characters displayed, one for each day of the week. The characters represent those days of the week for which the fare is valid. The interface also displays the status of the actual summary, i.e., whether or not the summary is complete, probably complete, partially complete or whether there is missing information.

Different types of information 110 can be represented in the fare rule summary table 86 by various visual indications, such as by changing the typeface of the text, or by making text either lowercase or uppercase. For example, for a day/time category cell that has the text "MTWRFSS", a bold typeface could indicate that the summary is complete. If the text is bold and italicized, that could indicate that the summary is probably complete but the summarizer process 100 can not be certain that the summary is complete. If the text is rendered in plain text, that could indicate that the summary is partially complete. If the text is plain text and italicized, that could indicate missing information, and so forth. Similarly, in the example, rendering a day of the week (e.g. "M" for Monday) in lowercase indicates that the traveler can only travel using that fare only during part of Monday, e.g. the fare is valid for use only if the departure is after 6 pm on Monday. Rendering a day of the week in uppercase indicates that the fare may be used for departure at any time on that day of the week.

Thus, the fare rule summary table 86 displays three types of information for each fare/category cell: the summary itself (the text in the cell in the example), whether or not the category passes for that particular fare (the background color in the example), and the status of the summary (the typeface used in the cell in the example).

The fare rule summary table 86 also displays which fares from one slice can be combined with fares in other slices to form valid pricing solutions. The fare combinality status is shown as a unique letter in one or more of columns 98 for each of the possible, legal combinations. For example, in a first column 98a "Column A" of the combinability section is an "A." This indicates that for each fare in slice 0 that has an entry in column A, those fares can be combined with other fares in other slices which also have an "A" entry in column A. The fare summarizer table 86 will have many of these columns 98b-98c, etc. e.g., column B, column C, and so forth, that are based on all of the possible combinations of which fares in the first slice can combine with fares in other slices.

Referring now to FIGS. 5 and 5A-5C, details of the fare summarizing process 106 (FIG. 4), as applied 120 to each faring market, is shown. The fare summarizing process 106 operates on each of the fares in each of the faring markets. It retrieves 122 a fare and for that fare retrieves each category 126. For each category in the fare, the process 106 retrieves 128 the record__2's for that particular category. The fare summary process 106 produces a new record__2 summary object 129 that is used to store a summary for the particular record__2. For each record__2, the fare summarizing process 106 tests 130 the record__2. The process determines 132 if the record__2 has tables. If the record__2 does not have any data tables, then the record__2 would definitely pass and the fare summarizing process 106 will mark 136, the record__2, as having passed the rule evaluation and provides the record__2 summary object with a "complete" status.

Each record__2 has one or more record__3's associated with it. If the record__2 does have data tables, the fare summarizing process 106 examines each record__3 associated with the record__2 and attempts to collect and summarize 134 the information contained within each record-3 for that category into a concise description for the category (also called a "cliche"). If a "cliche" is not found 138 for the record__2, then the fare summarizing process 106 will mark 142 the record__2 summary object with a status of "missing". Within this structure, the particular summarization algorithm used for summarizing record__2's and record__3's (necessarily) differs for each category; let us consider ATPCO category 2, day/time restrictions, as an example.

Each record__3 in ATPCO category 2 can describe disjunctive times of day during which the fare at hand is valid for travel; for example, one category 2 record__3 might specify that the fare may be used on Mondays between noon and midnight, and another record__3 might specify that the fare is also valid between Saturday at noon and Sunday at noon. Thus, the record-2 summary object would combine this information in one place, and into one description of the times during the week during which the fare is valid, rather than in the two separate record-3 objects. The record-2 summary object would also have a function which rendered the summary for display (resulting in the aforementioned "MTWRFSS" type of display).

The fare summarizing process 106 calls 144 specific segment summarizing functions for each of a record__2's record__3's until all of the record__3's have been summarized 146. The fare summarizing process 106 uses the record__3 summaries to summarize 148 the record__2 summary object, and the fare summarizing process 106 will test 150 to see if all the record__2's have been summarized. If they have not been summarized, the fare summarizing process 106 will retrieve 128 the next record__2. If all the record__2's have been summarized, the fare summarizing process 106 will use the record__2 summary objects to render a summary of 152 the category. The process will see if all categories have been summarized, 154. If all categories have not been evaluated, the process will retrieve 126 the next category. If all the categories have been summarized, the process 106 will test 156 if all the fares have been evaluated. If all the fares have not been evaluated, the fare summarizing process 106 will retrieve the next fare 122. If all the fares have been evaluated, the fare summarizing process 106 will use the results to summarize 158 the faring market.

As stated above, the detailed summarization algorithms are different for each category, based on specifics of the particular category. However, all category summarization algorithms share a common framework of classes and methods which provide default behavior, which each category can extend and modify, as needed. Exemplary pseudo code for the summarization process is shown in TABLE 1.

TABLE 1

```
For each fare:
For each category which has rules specified for this particular fare:
    Retrieve record-2's associated with this category
        For each record-2 associated with category:
            Create a new record-2-summary object in which to store a summary of this record-2.
                If the record-2 has no data tables, then the record-2 definitely passes.
                Mark the record-2-summary as:
                    definitely-passes with:
                        complete status.
                Else
                    Call the category-specific record-2 summarizing function. It should examine the segments
                    associated with this record-2, looking for a single, certain segment "cliche" (i.e. common
                    case which is easily summarizable and that we choose to implement), and that is
                    decomposable into a set of category record-3 provisions.
                        If such a cliche is not found, then mark
                        status=missing
                        Else
                        For each segment (i.e. record-3)
                            Call the category-specific record-3 summarizing function on the record-3
        After all record-3's have been summarized, propagate the results into the record-2 summary
    After all record-2's have been summarized, propagate the results into the category summary
```

Exemplary data structures to represent the summary data are given below in TABLE 2:

TABLE 2

Fare Rules Summary Data Structures
There are four levels of summaries for a given fare:

1) FARE-RULES-SUMMARIES: A vector of category summaries (CAT-SUMMARIES), one summary per category (or NIL if no rules for that category exist for the fare). FARE-RULES-SUMMARIES are not meant to be subclassed.

2) CAT-SUMMARIES: A summary of some particular category for some fare. Among other things, a CAT-SUMMARY object contains a list of CAT-REC-2-SUMMARIES. Particular categories may provide a subclass for this class (e.g. CAT-2-SUMMARY).

TABLE 2-continued

Fare Rules Summary Data Structures
There are four levels of summaries for a given fare:

3) CAT-REC-2-SUMMARIES: A summary of some particular record-2 for some category for some fare.
Among other things, a CAT-REC-2-SUMMARY object contains a list of CAT-REC-3-SUMMARIES. Particular categories may wish to provide a subclass for this class (e.g. CAT-2-REC-2-SUMMARY).
4) CAT-REC-3-SUMMARIES: A summary of some particular record-3 for some record-2 for some category for some fare. Particular categories may wish to provide a subclass for this class
(e.g. CAT-2-REC-3-SUMMARY).

In more detailed outline form (simplified somewhat for clarity), the data structures can be as in TABLE 3:

TABLE 3

<Fare rules summary for some particular fare>
PASSES-P: When the fare's rules are applied, does the fare pass?
RULES-VECTOR: A vector containing category-summary objects for the categories for which this particular fare has rules specified
<Category-summary for category 1>
CATEGORY-NUMBER: 1
PASSES-P:
When this categories' rules are applied, does the category pass for this fare?

TABLE 3-continued

STATUS:
What is the status of this category: Completely correct, probably correct, or missing information?
REC-2-SUMMARY-COMBINING-OPERATOR:
How do you combine the results of summarizing the record-2's for this category?
REC-2-SUMMARY-LIST: List of category-record-2 summaries for this category
<Category-record-2-summary-1>
STATUS: What is the status of this record-2: Completely correct, probably correct, or missing information?
REC-3-SUMMARY-LIST: List of record-3's for this rec-2 (rec-3's which do not have a date table mismatch.)
<Category-record-3-summary-1>
STATUS: What is the status of this rec-3: Completely correct, probably correct, or missing information?

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A computer-implemented method for producing a concise summary of fare rules and restrictions that the fare rules place on fares, the method comprising:
   parsing by one or more computers, a set of queries to provide at least one city pair corresponding to an origin and a destination of a flight slice;
   retrieving fares and fare rules for each city pair over a time period set in the query;
   evaluating by one or more computers, the retrieved fares against the retrieved rules and returning a status corresponding to pass, fail, or defer; and
   producing by one or more computers, a summary of the results of evaluating the rules for a fare against the criteria specified in the query; and
   displaying the summary on a user output device.

2. The method of claim 1 wherein producing further comprises:
   determining whether the summary is complete, likely complete, partially complete or whether the summary is missing information.

3. The method of claim 1 wherein producing further comprises:
   representing the summary in a table where rows of the table represent fare columns of the table represent fare rules or categories.

4. The method of claim 1 wherein producing further comprises:
   representing the summary in a table where rows of the table represent fares and columns of the table represent rules or categories; and
   applying a color to cells of the table with the color scheme signifying whether the cell corresponds to pass, fail, or defer status.

5. A computer program product residing on a computer readable medium for producing a fare rule summary comprises instructions for causing the computer to:
   populate a summary table of fares and corresponding evaluations for each fare rule category, each evaluation having a status; and
   render the summary table on an output device.

6. The computer program product of claim 5 wherein instructions to populate comprise instructions to:
   represent the summary table, as rows of the table representing fares and columns of the table representing rules or categories.

7. The computer program product of claim 5 wherein instructions to populate comprise instructions to:
   apply a color to cells of the table with the color scheme signifying whether the cell corresponds to pass, fail, or defer status.

8. The computer program product of claim 5 wherein instructions to populate comprise instructions to: populate one of the columns of the table with fare price for segments of an itinerary.

9. The computer program product of claim 5 wherein instructions to populate comprise instructions to: populate at least one of the columns with fare combinability restrictions.

10. The computer program product of claim 5 wherein instructions to populate comprise instructions to: populate the summary table with fares and their corresponding evaluations for each fare rule category, and the summary table depicts whether or not the categories have a status of pass, fail, or defer for the fares.

11. The computer program product of claim 10 wherein instructions to populate comprise instructions to: represent pass, fail, or defer results by unique visual indications.

12. The computer program product of claim 5 wherein instructions to populate comprise instructions to: populate the summary table with a status of the summary.

13. The computer program product of claim 12 wherein instructions to populate comprise instructions to: indicate whether the status is complete, likely complete, partially complete, or missing information by applying a unique visual indication.

14. A computer-implemented method for providing a fare rule summary tool as a user interface for display on a monitor, the method comprising:
   rendering by a computer on the monitor a fare evaluation result table that shows fare rule summaries for fares in slices of an itinerary, the fare evaluation result table having a first one of rows and columns representing fares and a second one of rows and columns representing the fare rule summaries with fares comprising an origin, a destination and a carrier, with each one of the fares being represented by a corresponding fare code in one of the first one of the rows and columns, and with a price associated with the fare displayed a second one of the first one of the rows and columns, and with the fare evaluation result table having the fare rules organized into categories of fare rules and the fare evaluation result table depicting whether or not the categories have a status of pass, fail, or defer for each fare.

15. The method of claim 14 wherein rows of the fare evaluation result table represent fares and columns represent the rule summaries.

16. The method of claim 14 wherein one of the columns represents fare price.

17. The method of claim 14 wherein at least one of the columns represents fare combinability restrictions.

18. The method of claim 14 wherein pass, fail, or defer result are represented by unique visual indications.

19. The method of claim 14 wherein the fare evaluation result table depicts the status of the summary, with the status of the summary represented by a unique visual indication.

20. The method of claim 19 wherein the status of the summary is whether the status is complete, likely complete, partially complete, or missing information.

21. A computer program product residing on a computer readable medium for producing a concise summary of fare rules and restrictions that the fare rules place on fares comprises instructions for causing a computer to:
   parse a set of queries to provide at least one city pair corresponding to an origin and a destination of a flight slice;
   retrieve fares and fare rules for each city pair over a time period set in the query;
   evaluate the retrieved fares against the retrieved rules and returning a status corresponding to pass, fail, or defer; and
   produce a summary of the results of evaluating the rules, the summary indicating the status of the rules for each category of rules; and
   display the summary on a user output device.

22. The computer program product of claim 21 wherein instructions to produce further comprises instructions to:
  determine whether the summary is complete, likely complete, partially complete or whether the summary is missing information.

23. The computer program product of claim 21 wherein instructions to produce further comprises instructions to:
  represent the summary in a table where rows of the table represent fares and columns of the table represent rules or categories.

24. The computer program product of claim 21 wherein instructions to produce further comprises instructions to:
  represent the summary in a table where rows of the table represent fares and columns of the table represent rules or categories; and
  apply a color to cells of the table with the color scheme signifying whether the cell corresponds to pass, fail, or defer status.

* * * * *

UNITED STATES PATENT AND TRADEMARK OFFICE
CERTIFICATE OF CORRECTION

| | | |
|---|---|---|
| PATENT NO. | : 7,966,205 B2 | Page 1 of 1 |
| APPLICATION NO. | : 09/812224 | |
| DATED | : June 21, 2011 | |
| INVENTOR(S) | : Rodney Daughtrey | |

It is certified that error appears in the above-identified patent and that said Letters Patent is hereby corrected as shown below:

Column 9, line 34, claim 3, after "represent fare" insert -- rules and --.

Signed and Sealed this
Eighteenth Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,966,205 B2 | Page 1 of 1 |
| APPLICATION NO. | : 09/812224 | |
| DATED | : June 21, 2011 | |
| INVENTOR(S) | : Rodney Daughtrey | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1205 days.

Signed and Sealed this
Seventeenth Day of July, 2012

David J. Kappos
*Director of the United States Patent and Trademark Office*